United States Patent [19]

Dravnieks

[11] Patent Number: 5,099,705
[45] Date of Patent: Mar. 31, 1992

[54] HAND-HELD RECIPROCATING WORKING TOOL

[76] Inventor: Konstantins Dravnieks, 220 Madero Dr., Thiensville, Wis. 53092

[21] Appl. No.: 446,192

[22] Filed: Dec. 5, 1989

[51] Int. Cl.⁵ .................... F16H 21/34; B23D 49/04
[52] U.S. Cl. ................................. 74/50; 30/392; 30/394; 74/49
[58] Field of Search ............ 74/49, 50; 30/392, 394; 173/49, 114, 123, 162.1

[56] References Cited

U.S. PATENT DOCUMENTS

| | | | |
|---|---|---|---|
| 1,349,283 | 8/1920 | Kollock | 74/50 |
| 2,895,514 | 7/1959 | Wright | 30/394 |
| 2,949,944 | 8/1960 | Blachly | 30/394 |
| 3,152,398 | 10/1964 | Freeman | 74/50 X |
| 3,240,966 | 3/1966 | Thompson | 310/50 |
| 3,729,823 | 5/1973 | Bos et al. | 30/394 |
| 3,916,921 | 11/1975 | Pesola | 132/73.6 |
| 3,942,251 | 3/1976 | Griffies et al. | 30/376 |
| 4,038,721 | 8/1977 | Kendzior | 17/23 |
| 4,145,811 | 3/1979 | Kendzior | 30/394 |
| 4,408,623 | 10/1983 | Murray | 132/73.6 |
| 4,643,207 | 2/1987 | Grahame | 132/73.6 |
| 4,699,036 | 10/1987 | Henne | 83/847 |

FOREIGN PATENT DOCUMENTS

| | | | |
|---|---|---|---|
| 2805012 | 8/1979 | Fed. Rep. of Germany | 30/394 |
| 1264595 | 5/1961 | France | 30/392 |

Primary Examiner—Allan D. Herrmann
Assistant Examiner—David W. Laub
Attorney, Agent, or Firm—Andrus, Sceales, Starke & Sawall

[57] ABSTRACT

A motorized reciprocating tool unit releasably receives a saw, file or like tools and includes a counterweight unit to stabilize system operation. The is greater than a weight necessary to compensate for the forces created during the working action. A variable counterbalance weight unit may be used to create during the tool operation to compensate for the changes in the reactive loading characteristic. The variable compensation counterweight unit includes a counterweight which is slidably mounted and a pivoting lever moving the counterweight in an opposite direction from that of the tool holder and drive. In the variable unit, the tool holder is mounted for pivotal movement and is spring loaded to the standby position such that work reaction forces deflect the tool and holder resulting in a relocation of the lever coupling to the counterweight unit. The ratio of the length of the lever arm varies to change the stroke of the counterweight and the counterbalance forces. The tool holder has a round opening with a larger diametric slot to receive a round shank as well as a flat shank associated with different tools and which are held in place by a set screw. The tool unit housing has an outermost housing for the power supply, either as a battery or a switch power lead assembly connected to a power cable. The tool housing permits access to the counterbalance weight for changing thereof.

9 Claims, 3 Drawing Sheets

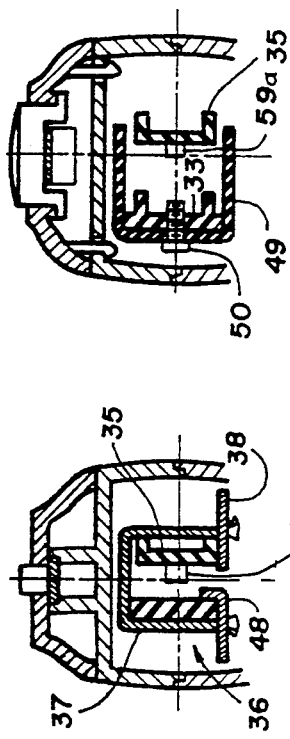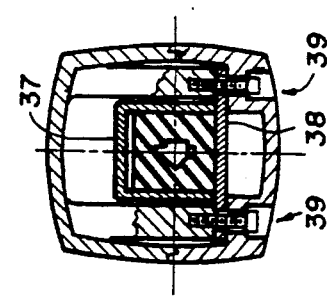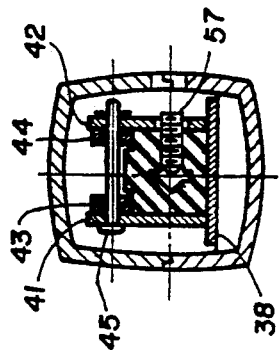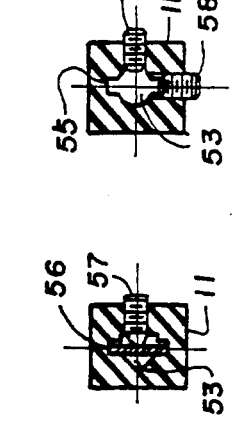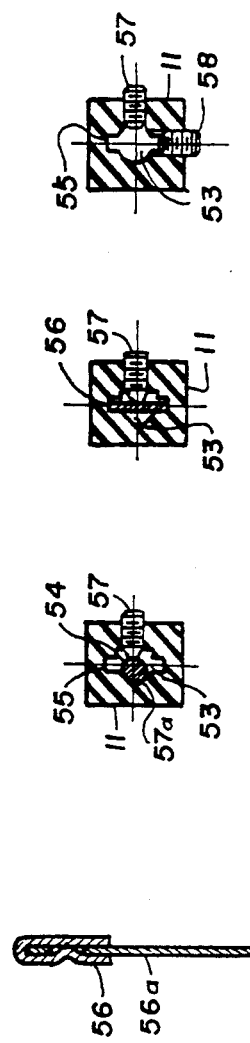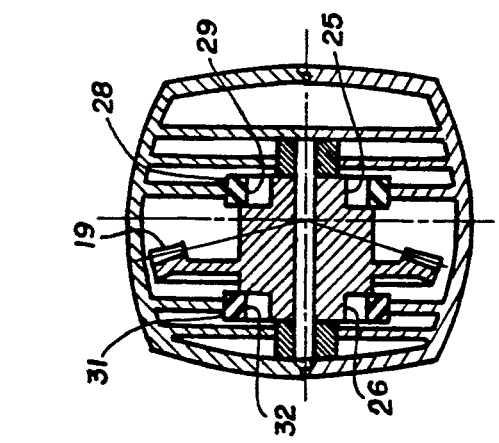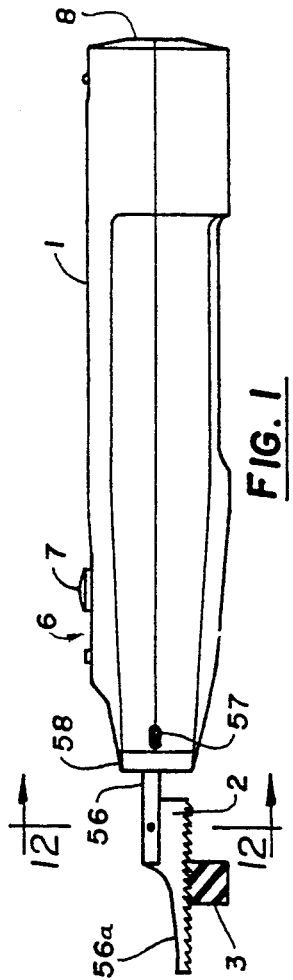

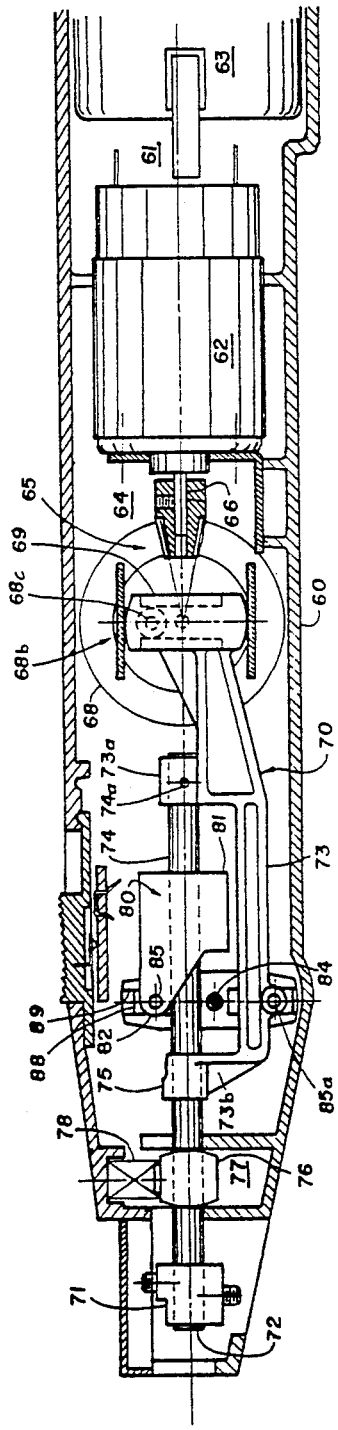
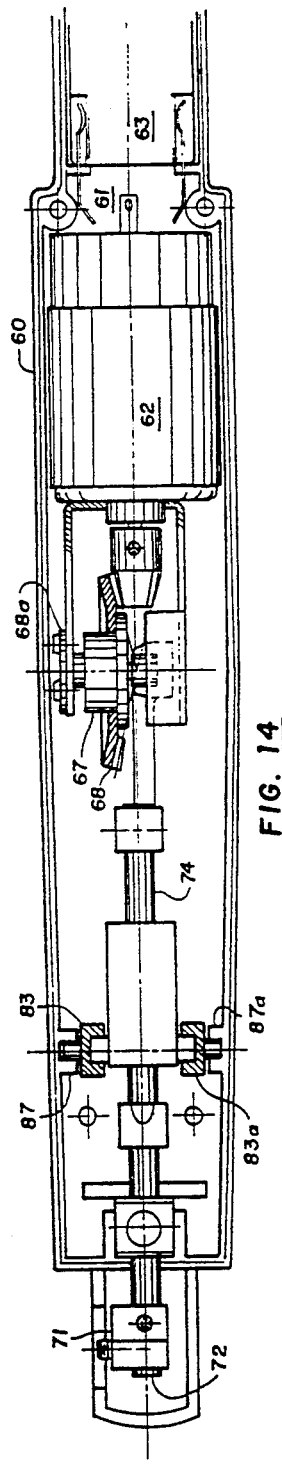
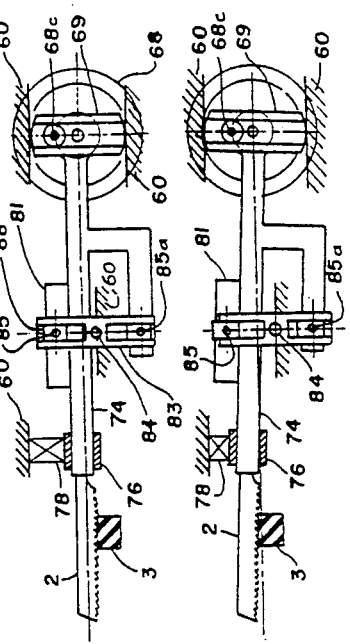
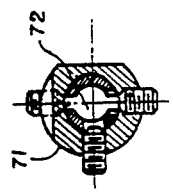
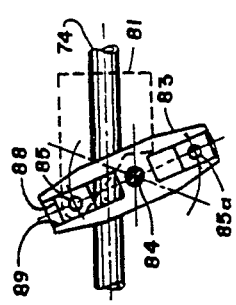

HAND-HELD RECIPROCATING WORKING TOOL

BACKGROUND OF THE PRESENT INVENTION

This invention relates to a portable hand-held motor driven tool unit and particularly to a small hand-held reciprocating tool adapted to selectively cut, sand or file a relatively stationary work member.

In the construction and forming of various elements, components must be cut and in other instances subject to surface working such as filing, sanding, rubbing or the like. Various specialized tools have been suggested for such system for effecting such working of a member and are advantageously formed to permit interchanging of the tool structures. For example, U.S. Pat. No. 3,240,966 discloses a small electromagnetic portable working tool which was specially designed for receiving various manicuring implements but also notes that it can be applied to other cutting tools such as files and saws as well as impact punches for design, stipling and the like. The structure discloses a battery operated system in which a gear train is coupled to a reciprocating blade support member. The support member projects outwardly of the housing and is adapted to receive a telescoped tool element. A similar device applied to a file structure is also disclosed in a more recent U.S. Pat. No. 4,408,623. In certain cutting equipment such as relatively large portable reciprocating power saws, consideration has been given to the natural balance and unbalanced forces created within the drive system. Thus, for example, U.S. Pat. No. 2,895,514 notes there is unbalance of the dynamic forces between the engine, the saw blade and the interconnecting drive elements. That patent adds a counterbalancing weight structure by using a firing piston which has a weight greater than the combined weight of a blade and a coupling mechanism. The extra weight of the firing piston counterbalances and compensates for the reactive forces created by the cutting action and the reactive force of the accelerating blade and the coupling member. Thus, the total saw mechanism is better balanced in such gas fired system. Considerations are also set forth in U.S Pat. No. 4,699,036 for an electric driven saw cutting mechanism for cutting of a stack of fabric with a mechanism generally known as a trevette or velvet knife. In this structure, an eccentric mechanism is driven to drive a reciprocating cutting blade. The mechanism includes a counterweight driven by a second eccentric oppositely directed to that of the first to compensate for inertia forces generated by the mass of the cutter. This patent also broadly discloses the concept of an external weight releasably mounted to permit the use of different weights for purposes of varying the compensation factor and particularly the turning moment which results from and remains as a result of the use of the two concentric systems. A portable hand held saw with a pair of concentric drives for respectively driving the blade and the counterweight is disclosed in U.S. Pat. No. 2,949,944, which issued Aug. 23, 1960. A saber saw structure employing a counterweighted mechanism is also further disclosed in U.S. Pat. No. 3,942,251, which issued Mar. 9, 1976. These and other patents thus disclose various reciprocating tools, some of which have various means for compensating for the weight and reaction forces within the driving mechanism.

Although various systems have thus considered the problem associated with such tools, there remains a need for a small, inexpensive portable tool particularly adapted for receiving of relatively small filing and cutting tools having means to maintain a very stable system operation.

SUMMARY OF THE PRESENT INVENTION

The present invention is particularly directed to a mechanized reciprocating working tool adapted to selectively receive various tools such as a saw, file or the like and including a counterbalancing mechanism to stabilize the system operation while producing a low cost effective tool drive system. In accordance with a particularly unique aspect of the present invention, a counterbalancing mechanism is provided having a weight greater than a weight necessary to compensate for the forces created during the working action. In another aspect of the teaching of this invention, to provide a variable adjustment is automatically created during the tool operation to compensate for the changes in the reactive loading characteristic. The tool holder is specially formed with a coupling end which is adapted to receive a round shank normally associated with various so-called needle files, rasps and abrasive paper holders as well as a superimposed slot for receiving of flat shanks such as associated with saber saw blades and the like. The tool is held to the tube holder in any suitable manner and preferably through a plurality of circumferentially distributed set screws or the like. In addition, the structure is specially constructed to provide a simple and low cost hand-held tool mechanism and particularly adapting the unit for a portable motor driven unit using a battery drive or AC powered motor unit having an interconnecting power cord.

Generally, in accordance with the teaching of the present invention, the present invention consist of a two piece housing with the one housing specially constructed to receive each of the necessary drive and coupling components and with the second housing specially constructed to clamp all of such mechanisms into place upon assembly of the two housings. The outer portion of the housing is provided to receive the drive motor. The outermost portion of the housing is adapted to receive a battery for driving of a DC powered unit or a switching mechanism and connecting power leads for an externally powered AC drive for energizing an AC motor or other power systems.

The forward portion of the housing includes a drive coupling mechanism including a special counterweight unit. The housing is preferably adapted to readily accept access to the counterbalance mechanism for adding or substracting of an appropriate weight structure. In accordance with a particular embodiment of the present invention, a bevel gear drive couples a rotary drive motor to a reciprocating tool reciprocating mechanism which includes a counterbalance mechanism, providing for a counterbalancing construction by either using of a fixed compromise counterbalance weight or alternatively providing an improved proportional change in the counterbalance forces by automatically changing the length of the stroke of the counterweight.

The counterweight mechanism can be matched to the tool structure by a compromise weight. A variable weight member can be mounted within the housing with means for adding and substracting of weight and thereby providing for customizing of a tool to a particular load assembly or the like. In accordance with an automatic adjusting compensation embodiment of the present invention, a counterweight mechanism is coupled through a pivoting lever to move in an opposite direction from that of the blade holder and drive structure. The use of lever is particularly desirable to establish a variable counterweight mechanism. In a preferred construction, the system is designed with equal lever arms and with the counterweight selected to balance the forces in the unload state of the tool. The tool drive member is mounted for pivotal movement in the plane of the work forces and is spring loaded to the standby position. The counterweight is direct coupled to the tool holder or coupling member. As the work reaction forces on the tool create a deflection of the tool, it results in a relocation of the holder and the pivot connection relative to the lever changing the coupling pivot position of the counterweight. The ratio of the length of the lever arms to the counterweight thus increases, and increases the stroke of the counterweight. By appropriate mounting of the supporting structure and particularly the support for the pivoting or moving holder, the device operates essentially vibration free under both no load and load conditions. The cutter will thus provide an improved cutting efficiency as well as a more convenient and readily operated free hand operation of the power tool.

In the design of the unit, a compromise weight version employed eccentrics on a common motordriven shaft and appropriate bevel gears or alternately rotary gear drives. The bevel gears are preferred, particularly in the battery driven system because it provides minimum power losses in the drive system.

The present invention provides a simple, low cost portable hand-held tool having an improved support and mounting structure for receiving of various types of implements including flat blade like couplings and conventional round coupling ends. In the preferred construction, the variable balancing force is provided which automatically and proportionately compensates for the cutting force generated reaction forces to produce a smooth efficient tool operation particularly under cutting.

BRIEF DESCRIPTION OF THE DRAWINGS

The drawings furnished herewith illustrated the best mode presently contemplated for the invention and are described hereinafter.

In the drawings:

FIG. 1 is a side elevational view of a tool constructed in accordance with the teaching of the present invention;

FIG. 4 is a vertical section taken on 4—4 of FIG. 3;

FIG. 5 is a vertical section taken on line 5—5 of FIG. 3;

FIG. 6 is a vertical section taken on line 6—6 of FIG. 3;

FIG. 7 is a vertical section taken on line 7—7 of FIG. 3;

FIG. 8 is a vertical section taken on line 8—8 of FIG. 3;

FIG. 9 is a separate sectional view of the tool holder illustrating the attachment of a tool with a round shank;

FIG. 10 is a view similar to FIG. 9 illustrating a tool with a flat shank;

FIG. 11 is a view similar to FIGS. 9 and 10 illustrating an alternate tool attachment opening;

FIG. 12 is a vertical section taken on lines 12—12 of FIG. 1;

FIG. 13 is a vertical sectional view illustrating a tool unit in accordance with the present invention incorporating an automatic adjustment of the counterbalance mechanism with the reactive forces on the tool;

FIG. 14 is a horizontal section of the tool unit shown in FIG. 13;

FIG. 15 is a sectional view illustrating an alternate tool support;

FIG. 16 is a separate view of a lever shown in FIGS. 13 and 14 in an alternate position in response to the movement of the reciprocating tool unit; and FIGS. 17 and 18 are diagrammatic illustrations of the drive and coupling system shown in the embodiment of FIGS. 13 and 14 for clearly illustrating the automatic adjustment of the counterweight mechanism in the illustrated embodiment of the present invention.

DESCRIPTION OF THE ILLUSTRATED EMBODIMENTS

Figure 2:
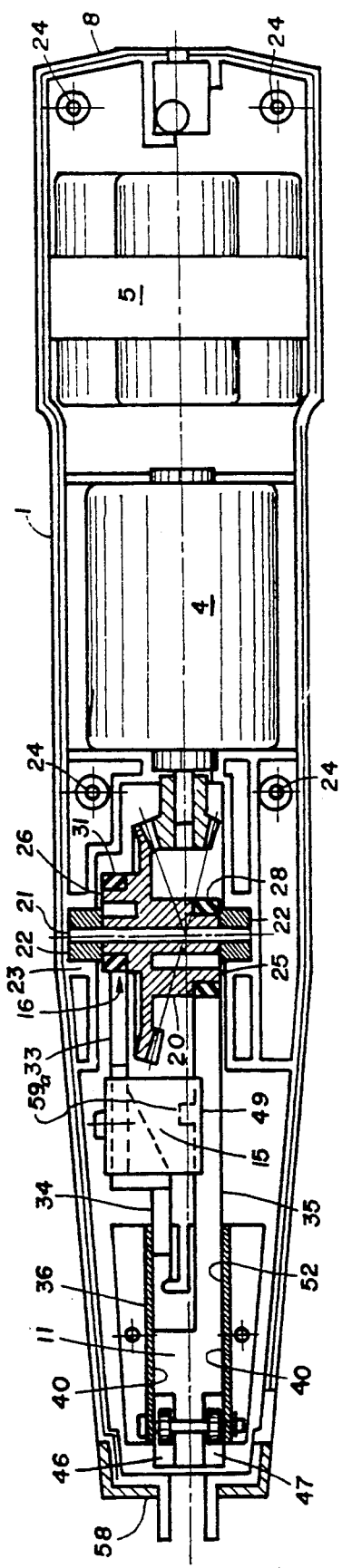
FIG. 2 is a horizontal section taken generally on a housing separation line of the tool shown in FIG. 1.

Referring to the drawings and particularly to FIGS. 1 and 2, the illustrated tool is a reciprocating hand-held cutting tool including an outer elongated housing 1 having a cutting tool 2 mounted in the forward end. The housing 1 is adapted to grasp in one hand and manipulated for cutting or otherwise working the surface of a work member 3. The housing 1 is specially constructed with an intermediate motor chamber within which a suitable electric or other drive motor 4 is secured. Immediately behind the motor 4, a power supply chamber 5 is formed within the housing. In the illustrated embodiment of the invention, the motor 4 is shown as a direct current (D.C.) motor with a power battery pack 5 provided within the power supply chamber. A control switch unit 6 is mounted to the forward end of housing 1 and coupled to an external slide button operator 7 to open and close the connection of battery jack 5 to the motor 4. Alternately, motor 4 is an A.C. motor with a power cable projecting outwardly through the rear wall 8 of the housing and connected through a suitable connection within chamber 5. The housing 1 is preferably constructed of a standard design for either drive motor and power connection. Immediately forward of the motor is a transmission and coupling chamber 9. A drive transmission unit 10 interconnects the rotary output of the motor 4 to produce a high torque output and converts the rotary motion of the motor into a reciprocating linear motion. A tool holder 11 is reciprocately mounted within the front or forward end portion of the housing 1. The forward wall 12 of housing 1 includes an opening 13 for access to holder 11 and releasable attachment of the working tool 2. The holder 11 is formed as a part of an eccentric drive unit 14 of the transmission unit 10. The cutting tool 2 may, for example, be a saw blade releasably secured to the tool holder, a file or suitable reciprocating tool member. A reciprocating motion is imparted to the tool 2 for cutting or otherwise working of the work member 3. In accordance with the present invention, a reciprocating counterweight unit 15 is located within the housing and particularly between the holder 11 and the drive transmission unit 10. The counterweight unit 15 is secured to an eccentric unit 16 coupled to unit 26 for reciprocating 180 degrees out of phase from the tool holder 11. The unit 15, as coupled to the tool holder 11, creates an opposing force with respect to the weight and reactive forces on the tool holder 11 and thereby provides balanced forced movement of the tool, and eliminates vibrational forces and results within the working tool 2, under both standby energization and working conditions. The counterweight unit 15 compensates for the inertical forces of the tool holder 11 and the tool 2 and the associated reciprocating drive mechanism, and in addition, compensates for the reaction forces created by the cutting forces.

Thus, the applicant has realized that the weight selection is directly related to the characteristic operation of the tool. Generally, for most satisfactory working, the weight is selected to have a significant overweight such that as the operator moves the tool into engagement with the work, the counterbalance effect balances the forces of the tool and tool holder assembly and the reaction forces under working conditions. With such a selection however, one will find a slight vibration in the hand tool under no load conditions. Conversely, if the weight is selected to eliminate vibration under no load conditions, some slight vibration will be developed and occur under working conditions. Thus, one must select the best mode depending upon the condition under load and no load conditions. The counterbalance system can, with an automated control system such as hereinafter described, provide automatic compensation for changes in the working condition.

More particularly, the motor is any conventional or desired design adapted to establish an output drive sufficient to activate the cutting tool as well as providing any power loss within the coupling mechanism. The housing is preferably formed with appropriate internal wall structures for clamping of the various components in place including the batteries, the motor assembly and the gear drive assembly, with the interconnection of the two housing halves.

Figure 3:
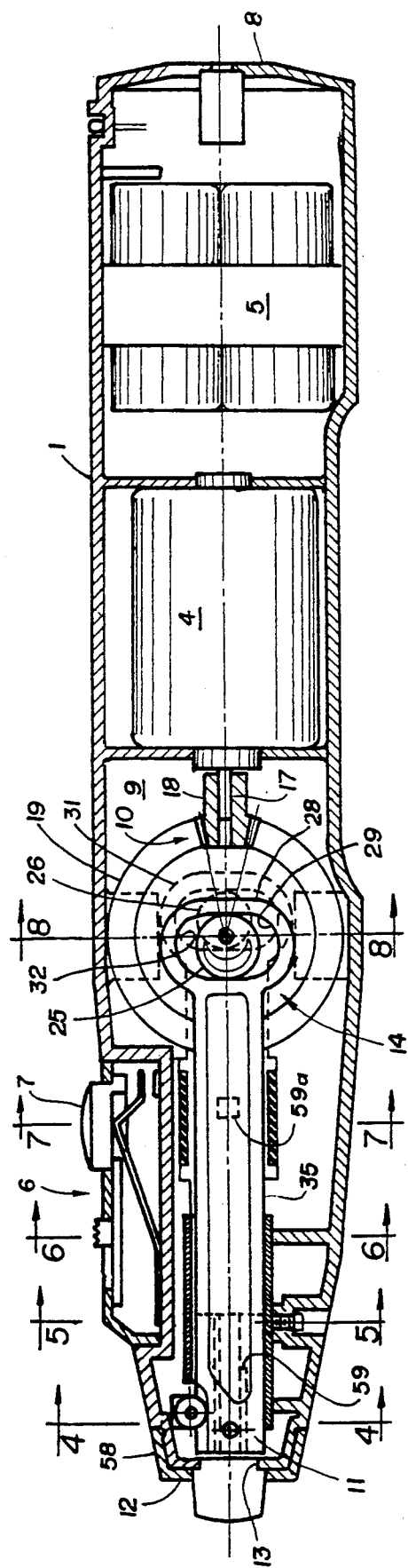
FIG. 3 is a vertical section of the tool shown in FIGS. 1 and 2.

Referring particularly to FIGS. 2 and 3, the motor is shown as a DC motor 4 having an output shaft 17 projecting axially of the tool housing. The motor 4 is coupled by the transmission unit 10 to drive the tool holder 11. The unit 10 includes a bevel gear drive having a relatively small bevel gear 18 fixed to the motor shaft 17. A large bevel gear 19 is rotatably mounted within the housing 1 on an axis extending perpendicular to the motor axis, and with the plane of the bevel gears axis intersecting on the motor axis. The large bevel gear 19 is located to one side of the housing 1 and includes a hub 20 journaled on a supporting shaft 21. The bearing members 22 are secured within an appropriate recesses 23 in the housing shown with integrally formed walls 23, with the bearing clamped therein by securement of the housing together. The support wall for the bearings as well as the motor batteries 5 and the other components are all preferably located and held in place by integrally molded walls within housing 1. As shown, the housing members are secured to each other by suitable clamping screws 24, and with the edges offset and overlapped as shown in FIGS. 4-8. The bevel gear hub 20 projects across the housing and includes axially spaced cam members 25 and 26 integrally formed on the opposite ends thereon. Each member 25 and 26 is a circular member having its axis offset from the axis of shaft 21. The cam members 25 and 26 are offset from each other by precisely 180 degrees. The tool holder eccentric unit 14 has a coupling follower 28 having an elongated diametric slot 29 meshing with the first cam member 25. The compensating counterbalance unit 16 has a similar coupling follower 31 with an elongated diametric slot 32 meshing with the second cam member 26. The cam members 25 and 26 rotate within the respective diametric slots in the followers, and with the offset axis force, the crank members move in a linear reciprocating motion in response to 180 degree rotation of the cam members.

The eccentric unit 16 for the counterweight includes an arm 33 projecting outwardly from the follower 31 toward the tool holder 11. The outer end of arm 33 terminates within the housing 1 and forwardly of the large bevel gear with an outermost offset plate 34.

The eccentric unit 14 for the holder 11 has the arm 35 connected with the follower 28 and the holder 11, and preferably formed as a single integral plastic unit. The tool holder 11 is shown as a plastic molded block integrally formed with the crank arm 35. The tool holder 11 projects forwardly from arm 35 and is slidably mounted within a tubular guide unit 36 secured within the forward and of the housing 1.

The tool guide unit 36 includes a guide tube 37 secured within the forward end of the housing 1. The illustrated guide tube 37 includes a base plate 38 bolted, as at 39, or otherwise secured, to the adjacent housing member. An inverted U-shaped wall member 40 is secured to the plate 38 and defines a rectangular opening generally corresponding to the configuration of the tool holder 11. The forward end of the U-shaped wall member 40 has an open top portion with upwardly projecting side lips 41 and 42. A pair of laterally spaced rollers 43 and 44 are mounted on a common shaft 45 which is secured between the lips 41 and 42. The rollers 43 and 44 are located to mate with and engage a corresponding edge recess, as 46 and 47, in the top wall of the tool holder 11. The rollers 43 and 44 guide the forward end of the tool holder for low friction sliding reciprocating movement and a corresponding movement of the attached tool.

The guide tube 37 extends inwardly of the housing 1 from the tool holder 11 and the inner end forms a guide for the arms 34 and 35 of eccentric units 14 and 16. A bottom C-shaped cross section 48 is formed in the one side of the guide tube 37 aligned with the counterweight plate 34, as shown in FIG. 6. The eccentric unit 14 includes the front guide plate 34 extending from the member and into the L-shaped opening of the guide section 48.

The counterweight unit 15 includes a generally U-shaped weight member 49 telescoped over the central portion of the counterweight eccentric arm 33. The weight member 49 is mounted immediately behind the tool holder and the guide unit 36 and is located between the tool holder 11 and bevel gear 19. The weight member 49 is releasably secured to the arm member by a coupling pin 50 to permit the attachment of a weight appropriately related to a particular transmission unit 10, tool holder 11 and tool 2.

As most clearly shown in FIGS. 3 and 6, the opposite side of the guide tube 37 is formed with the top and bottom walls defining a guide for connecting arm 35 of the tool eccentric unit 14 slidably mounted therein for guided movement of the eccentric unit 14 and holder 11.

The tool holder block 11 is formed with a central opening 53 to receive a round shank 54 of the working tool 2. A diagrammatical slot 55 is formed extended through the central opening 53 to receive a flat shank 56 of a working tool 2. A screw 57 is secured to adjacent sides of the outer end portion of the tool block for releasable securement of tool 2 within the opening 53, or slot 55. The central opening 53 is shown in FIGS. 4, 5 and 9 with an offset V-shaped wall 57a opposite screws 57, within which the round shank 54 is clamped by screw 57. The opening 53 may be formed with a round portion opposite screw 57 as shown in FIG. 11.

Files and similar devices normally have a round shank and the opening 53 is specially constructed to accommodate various sized shanks. Saber saws and other like tools normally have a flat coupling shank 56. The cross slot 55 is constructed to receive such tools and particularly the flat shank. The set screw 57 provides for securely locking of either type tool within the holder and thereby creating reciprocation with the energization of the drive motor.

The outer end of the tool is preferably provided with a cap 58 which substantially closes the forward open end 3 of the housing and creater an opening only sightly larger than necessary for introduction of the tool and the reciprocation of the tool.

The outer end of the housing 1 is preferably provided with a close fit to the tool shank structure to minimize entrance of fine dirt, metal dust and the like foreign materials. Such material entering into the tool could of course effect the internal operating mechanism and shorten the life thereof.

To this end, the tool 2 which has an offset surface, such as the illustrated saw and the like are specially constructed so as to fit within the opening without the offset cutting portion engaging the front cap 58 or other portions of the housing. Such tools have the flat plate structure as previously discussed. The shank receiving groove or slot 55 in the holder 11 is, in accordance with one embodiment of the invention, formed with one side of slot 55 terminating in a ledge 59 to locate the blade projecting from the cap structure to prevent the interengagement thereof.

As shown in FIGS. 2, 3, 6 and 7, the reciprocating tool arm 35 connected to the holder 11 is also provided with a tab 59a projecting inwardly into alignment with the round shank opening for receiving of a conventional shank of a file, sanding tool or the like. Such tools are generally provided with a standard elongated shank and the stop will ensure the appropriate location to prevent the cutting or working surfaces of the tool from moving into engagement with the housing and particularly the close spaced opening.

In a preferred construction of the invention, the blade structure has been specially formed with a relatively heavy rigid shank 56 adapted to fit into the slot. The blade structure is formed as a relatively thin plate 56a secured within the shank and projecting outwardly therefrom. Thus, the shank can be formed with an appropriate recess with the thin blade telescoped therein and appropriately secured by any suitable adhesive, welding or the like. In a hand operated portable tool such as disclosed, the saw blade is often used on plastics, wood and soft steels. With a harder steel member or other similar work, a relative heavy blade structure may be required. For such heavy work however, a small hand portable unit having a housing similar to that used in a carving knife structure will not have an appropriate output power to satisfactorily and operate on such work members. With an A.C. driven unit, the motor output can be more readily constructed to handle such work loads. Thus, the illustrated tool provides a further versatility to the hand operated vibrating tool apparatus of this invention.

An alternate embodiment of the invention includes an automatic compensation for the varying loads on the tool and the resulting reaction forces, as shown in FIGS. 13–18.

The alternate embodiment is illustrated having an elongated housing 60 with a rear drive chamber 61 including a D.C. motor 62 and a battery 63 for energizing the motor. A coupling chamber 64 including a bevel gear unit 65, is mounted to the housing and coupled to the motor shaft 66, generally as in the first embodiment.

In the second embodiment, the large bevel gear 68 is fixed to a rotating hub 67 which is rotatably mounted in a bearing unit 68a secured to one side of the housing. The hub 67 has an enlarged flange with an offset crank or pin or cam 68b offset from the center. A cam follower 69 is provided with a linear slot mating with the cam 68b. The follower is shown as a plastic member guided for movement on a line perpendicular to that of the cam follower slot. Thus, as the hub 67 rotates, the cam rotates off center, moves up and down within the recess and simultaneously causes the perpendicular motion of the cam follower and interconnected crank arm. The crank 68b has an offset pin 68c with friction reducing roller coupled to a crank follower 69, which is integrally formed as the end of a crank arm unit 70. The arm unit 70 projects forwardly through the housing and terminates in a tool holder 71 within the front end of the housing. The holder 71 is similarly constructed with a dual opening unit 72 to receive a round shank or a flat shank of a tool 2.

The arm unit 70 has a U-shaped arm member 73 forming an offset central portion integrally formed with the cam or crank follower 69. An in-line rod 74 is connected by a pin 74a to the one end arm 73a of arm member 73 in spaced relation to the bevel gear unit 65. The rod 74 projects forwardly through a supporting hub 75 secured on the upstanding forward end arm 73b of the arm member 73. A spring loaded guide bearing 76 is movably mounted within a guide chamber 77 in the housing. The bearing 76 is aligned with rod 74, and supports the forward end of the arm unit 70. A resilient member shown as bias coil spring 78 is located within the chamber 77 to the one side of guide bearing 76 and resiliently holds rod 74 in a standby working alignment within the housing.

In the alternate embodiment illustrated, a counterweight unit 80 is shown mounted to the rod 74. In particular, the counterweight unit 80 includes a weight 81 in a form of a member slidably mounted on rod 74 within the opposite ends of the U-shaped arm member 73. The weight 81 has a forward projection 82. Similar pivoted levers 83 and 83a are pivotally mounted to the opposite sides of the U-shaped arm 73 and counterweight 81. Referring to lever 83, upper end of the lever is pivoted by a pin 85 to the forward projection 82 of the weight 81. The opposite or lower end of the lever is similarly pivoted by a pin 85a to the bottom run or arm of the U-shaped arm member 73.

The central pivot pin 84 which extends through the lever with the opposite ends journalled in suitable aligned hubs 87 and 87a integrally formed on the opposite side walls of the housing 1. The pivoted lever 83a is similarly mounted and coupled to the arm unit 73 and counterweight 81. The pivot levers 83 and 83a are thus affixed to the housing with a generally horizontal pivot axis. The opposite ends of the lever and particularly the pivot connections to the weight and to the arm unit 73 are free to move in a slightly arcuate direction or circle with respect to the fixed pivot support.

The pivot connection between the counterweight 81 and the lever 83 and similarly between the arm 73 and the lever 83 includes similar connections. Thus, referring to the coupling of the counterweight 81, the coupling pin 85 projects laterally from weight 81 into the lever 83. The outer end of the pin fits in a sliding block 88 slidably mounted in a radial and complementing slot 89 in the lever. Thus, as the lever pivots, the pin 85 pivots in block 88 which moves radially within the slot 89 thereby permitting the relative movement on the line of the lever as the lever rotate. Rotation of levers 83 and 83a move the weight 81 in a direction opposite that of the tool and tool holder.

The counterweight 81 is preferably formed of a suitable self-lubricating material such as an appropriately oil impregnated bronze, nylon or other similar bearing plastics or the like. The weight essentially will equal the weight of the reciprocating parts including the average weight of the tool similar to the previously described system.

More particularly, the spring loaded unit on the forward end of the rod 74 establishes the normal in-line positioning of the drive rod 74 with the levers 83 and 83a located essentially perpendicular to the axis of rod movement and with the counterweight 81 located generally centrally on the rod 74 between the opposite end arms 73a and 73b of the U-shaped arm 73. If the tool moves on the axis of the drive system rod, the levers 83 and 83a pivot to move the weight 81 in the opposite direction of the tool and thus pivots a selected range as shown in FIG. 16.

However, as the cutting and reaction forces applied to the working edge or face of the cutting tool 2 increase, slight deflection of the cutting tool 2 and the interconnected holder and rod 74 is created. The drive assembly will thus pivot about the bevel gear coupling against the force of the bias spring. The pivot levers 83 and 83a are fixed at the central pins and thus maintain that position. In the pivotal movement of the drive rod assembly, the drive pins 85 and 85a are repositioned within the opposite ends of lever with the length of the lever arm to the opposite sides of the center pivot pin varying inversely. Thus, the length of the lever arm to the counterweight will increase as the load increases. Conversely, as the reaction load decreases, a reverse setting of the levers 83 and 83a are created. The tool holder 71 and tool 2 continue to operate with the reciprocating motion of the tool and the reverse movement of the counterweight under both load and non-load conditions. However, the degree of motion created will vary directly with the load.

With an essentially equal zero or minimum load of the tool 2, the weight moves generally as typically shown in FIG. 17. As the reaction forces increases, the levers 83 and 83a will typically vary its movement as the result of the action of the rod as shown in FIG. 18. Thus, the difference in the length of the movement of the counterweight will provide a corresponding balancing of the increased reaction forces and maintain the desired smooth more effective balancing of the forces.

The first embodiment may be modified to incorporate a similar automatic counterweight compensated system by spring-loading the guide housing to simultaneously pivot the drive and counterweight unit, and replacing the counterweight eccentric drive with a lever or other adjustable mechanical coupling of the counterweight to the drive unit.

Deflection of the tool by the reaction load varies the mechanical coupling to inversely move the tool assembly and its drive with respect to the counterbalance weight unit. The continous compensation for the assembly would provide the desired effective and reliable balancing of the system with the changing reaction forces.

In summary, in this embodiment of the present invention, the tool holder 71 is resiliently loaded by a spring unit to urge the tool 2 to a stand-by in-line operating position. The spring 78 establishes a normal holding force to allow the creation of a working pressure between the tool and the work. As the reaction working force is increased to a selected level which is greater than the force of spring 78, the tool and holder 71 pivots outwardly, as shown in FIGS. 17 and 18. The pivoting of arm unit 70 relative to the counterweight drive lever which has the first pivot changes the length of the lever arms and the coupled weight 81 and arm 73 thereby producing a variation in the length of the stroke of the sliding counterweight 81. The counterweight stroke increases with increases in the reaction forces and decreases as the reaction forces decrease.

Various modes of carrying out the invention are contemplated as being within the scope of the following claims particularly pointing out and distinctly claiming the subject matter which is regarded as the invention.

I claim:

1. A portable hand-held tool apparatus, comprising a hand-held housing particularly adapted for support and manipulation with one hand operation, a motor unit mounted within said housing in spaced relation to a working end of said housing a tool holder slidably mounted within the working end of said housing and adapted to receive a tool, a bevel gear reduction unit mounted within said housing and having a small bevel gear connected to said motor and a large bevel gear rotatably mounted within said housing in meshing engagement with said small bevel gear, said large bevel gear being located adjacent one side of said housing, a hub member secured to said large bevel gear and projecting laterally across said housing in line with the axis of said small bevel gear, a first eccentric unit secured to said hub member and having an eccentric mounting to establish an eccentric motion in a plane parallel to the movement of the tool holder, a second eccentric unit coupled to said hub member in axially spaced relation to said first eccentric unit and establishing an eccentric motion in a plane parallel to the plane of said first eccentric unit, said first and second eccentric units being offset 180 degrees whereby the eccentric motions in said parallel planes are diametrically opposite from each other, said first eccentric unit having a member connected to said sliding tool holder, a counterbalance weight unit slidably mounted within said housing, said second eccentric unit including an arm connected to said counterbalance weight unit and thereby moving the counterbalance weight unit in the opposite direction of said tool holder, said counterbalance weight unit being selected with counterbalance effect in excess of the weight of said tool holder and said tool and the reactive forces on said tool.

2. In the apparatus of claim 1, wherein said counterbalance weight unit includes at least one U-shaped counterweight, said arm of said second eccentric unit having a plate portion, said counterweight being removable attached to said plate portion for varying the weight of said counterbalance weight unit, said housing having a removable section permitting access to said plate portion for said releasable attachment of said counterweight.

3. The apparatus of claim 1, wherein said housing is an elongated cylindrical type housing adapted to be hand-held in one hand for manipulation and work engagement.

4. A hand-held vibrating tool unit comprising an elongated housing having a front tool holder chamber and an intermediate coupling chamber and a rear motor chamber, a sliding tool assembly including a tool holder slidably mounted within said tool holder chamber and said coupling chamber for reciprocating movement, a counter weight unit slidably mounted within said housing in alignment with said tool holder, a drive motor mounted within said motor chamber, a gear reduction drive unit coupled to said motor and having an output driven gear member, said tool holder having a tool receiving opening for releasably receiving a plurality of different tools, said counterweight unit has a weight greater than the sum of the weight of said sliding tool holder and interconnected tool.

5. The hand-held vibrating tool unit of claim 4, wherein said housing is a linear housing having a substantially constant cross-section, said gear reduction drive unit and said tool assembly located substantially in the forward half of said housing and a power supply assembly located substantially in the rearward portion of said motor chamber and said motor located between said drive unit and said power supply assembly, and said housing having a handle portion located adjacent the motor and gear reduction drive unit.

6. A hand-held vibrating tool unit comprising an elongated housing having a front tool holder chamber and an intermediate coupling chamber and a rear motor chamber, a sliding tool assembly including a tool holder slidably mounted within said tool holder chamber and said coupling chamber for reciprocating movement, a counterweight unit slidably mounted within said housing in alignment with said tool holder, a drive motor mounted within said motor chamber, a gear reduction drive unit coupled to said motor and having an output driven gear member, said tool holder having a tool receiving opening for releasably receiving a plurality of different tools, said tool receiving opening including an elongated cylindrical slot for receiving a round shank of a tool and having first and second edge recesses in said cylindrical slot defining a planar slot passing through said cylindrical slot for receiving a flat shank of a tool, said flat shank being in a shape of a flat plate complementing said planar slot and releasable means for releasably holding said shank within said tool receiving opening.

7. The tool unit of claim 6, wherein said cylindrical slot has a pair of adjacent inclined walls, and said releasable means includes a threaded clamp member secured to the holder in opposed alignment with said inclined walls.

8. The tool unit of claim 6, including first stop means aligned with the inner end of said tool receiving opening to limit the extension of the round shank into the opening, and a second stop means located in said edge recesses to limit the extension of the flat shank into said planar slot.

9. The tool unit of claim 8, wherein said cylindrical slot has a pair of adjacent inclined walls, and said releasable means includes a threaded clamp member secured to the holder in opposed alignment with said inclined walls.

* * * * *

UNITED STATES PATENT AND TRADEMARK OFFICE
CERTIFICATE OF CORRECTION

PATENT NO. : 5,099,705
DATED : March 31, 1992
INVENTOR(S) : KONSTANTINS DRAVNIEKS It is certified that error appears in the above-identified patent and that said Letters Patent is hereby corrected as shown below:

Claim 1, Col. 10, Line 35, after "housing" insert -- , --;
Claim 4, Col. 11, Line 16, delete "counter weight" and substitute therefor -- counterweight --.

Signed and Sealed this

Twenty-ninth Day of June, 1993

Attest:

MICHAEL K. KIRK

*Attesting Officer*  *Acting Commissioner of Patents and Trademarks*